United States Patent [19]

Oguma et al.

[11] 3,996,100

[45] Dec. 7, 1976

[54] VENTED NUCLEAR FUEL ELEMENT

[75] Inventors: Masaomi Oguma; Akira Maru, both of Hitachi; Eiichi Sagi, Iwaki; Seiji Kawahara, Hitachi, all of Japan

[73] Assignee: Hitachi, Ltd., Tokyo, Japan

[22] Filed: Feb. 21, 1974

[21] Appl. No.: 444,683

[30] Foreign Application Priority Data

Feb. 21, 1973  Japan .............................. 48-20211

[52] U.S. Cl. .................................. 176/68; 176/37; 176/79; 176/93 R
[51] Int. Cl.² ........................................ C09K 7/00
[58] Field of Search .............. 176/68, 79, 93 R, 37

[56] References Cited

UNITED STATES PATENTS

| 3,459,636 | 8/1969 | Germer | 176/68 |
|---|---|---|---|
| 3,607,638 | 9/1971 | Seim | 176/68 |
| 3,697,377 | 10/1972 | Gauthron | 176/68 X |
| 3,801,447 | 4/1974 | Heenan | 176/68 X |
| 3,813,287 | 5/1974 | Malang | 176/68 |

FOREIGN PATENTS OR APPLICATIONS

| 1,537,172 | 2/1968 | France | 176/68 |
|---|---|---|---|
| 1,581,632 | 7/1968 | France | 68/ |

OTHER PUBLICATIONS

Venting Device for Sodium–Cooled Fast Reactor Ceramic Fuel Elements, Martini et al., Nuclear Tech., vol. 19, Aug. 1973, pp. 96-110.

Primary Examiner—Stephen C. Bentley
Assistant Examiner—Peter A. Nelson
Attorney, Agent, or Firm—Beall & Jeffery

[57] ABSTRACT

The vented nuclear fuel element comprises a cladding tube containing nuclear fuel therein and a device disposed in the upper portion of the cladding tube for venting gaseous fission products released from the nuclear fuel. The venting device comprises a porous plug for closure of the top end of the venting tube, which plug has the property of getting wet with the surrounding coolant, two plates that in cooperation with the cladding tube define a chamber for holdup of the gaseous fission products, a capillary tube for introducing the gaseous fission products from the nuclear fuel into the upper portion of the chamber, another capillary tube for introducing the gaseous fission products from the lower portion of the chamber to the porous plug, and a check valve for preventing the gaseous fission products within the chamber from flowing back into the interior of the cladding tube. Upon operation of the nuclear reactor, the gaseous fission products released from the nuclear fuel will pass through the check valve and the first mentioned capillary tube to reach the chamber, and from the chamber the gaseous fission products will pass through the second mentioned capillary tube and be vented through the porous plug to the coolant surrounding the nuclear fuel element.

5 Claims, 2 Drawing Figures

VENTED NUCLEAR FUEL ELEMENT

BACKGROUND OF THE INVENTION

The present invention relates to a vented nuclear fuel element, particularly to one which can discharge gaseous fission products released from nuclear fuel after a holdup period of a sufficient long time, without introducing the coolant surrounding the fuel element into the nuclear fuel.

Some conditions that are necessary for a vented nuclear fuel element of a fast breeder reactor in which liquid metal, particularly sodium, is the coolant, ar as follows: (1) It must be able to prevent the admission of the liquid metal coolant into the fuel element portion containing the nuclear fuel during its lifetime, because the contacting of the nuclear fuel, usually $(PU-U)O_2$, and the liquid metal coolant, usually Na, is undesirable; and (2) It should be able to prevent pollution of the cooling system and cover gas system by radioactivity.

In order to minimize the pollution, it is necessary for the nuclear fuel element to holdup the gaseous fission products therein for a period of time sufficient for the products to become stable or comprise only long half-life fission products, which products may be considered harmless with respect to radioactivity. Also, the components of the venting device must be able to withstand the difficult conditions of temperature, ratiation, heat cycling, and the like are encountered in a nuclear fuel element.

In the prior art, it is known to provide a diving bell type venting device having a vent tube extending upwardly to the interior of the upper portion of a cladding tube and a plurality of holes provided for the cladding tube near the lower end of the vent tube. This venting device has a high reliability, since it is simple in its construction and is not influenced by changes in its material property due to eradiation. However, the venting device has a disadvantage such that the device must be of a considerable length and quite large in its construction, in order to holdup gaseous fission products for a long time or in order to perfectly prevent admission of the surrounding coolant into the interior of the fuel element.

Another diving bell type of venting device, according to the prior art, has another vent tube extending downwardly from the top of the cladding tube, in addition to the above mentioned vent tube that extends upward. The top portion of the vent tube that extends downward is pinched and exposed in the surrounding coolant. The pinched portion has a function of raising the pressure in the interior of the fuel element, which function is caused by the spring back of the vent tube. This device has a simple construction, however, it has drawbacks, for example, radiation to the vent tube may result in damaging the material so as to impair the spring back function, and further solid materials included in the gaseous fission products may become inserted or wedged into the pinched portion, which will result in failure of the pinched portion function.

Further, the prior art includes a venting device for a nuclear fuel element, which comprises a porous plug closing the top end of the fuel element. This venting device is excellent with respect to economy, because of its minimum construction. However, the device has problems in that it is not able to prevent admission of the surrounding coolant into the fuel element by a gradual change of the surface tension of the porous plug, in the case where the device is inserted in a core for a nuclear reactor for a long time.

SUMMARY OF THE INVENTION

It is an object of the present invention to provide a vented nuclear fuel element which can holdup gaseous fission products released from nuclear fuel for a long time, without making a device for venting the gaseous fission products of an unduly large size.

Another object of the present invention is to provide a vented nuclear fuel element that is simple in its construction and has high reliability.

In summary, the invention resides in a device for venting gaseous fission products released from nuclear fuel in the interior of a vented nuclear fuel element, which device comprises means for defining a chamber for holdup of the gaseous fission products, means communicating with the lower portion of the chamber for allowing venting of the gaseous fission products into the surrounding coolant of liquid metal, which means has a plurality of holes and a property of getting wet to the surrounding coolant, means for introducing the gaseous fission products from the nuclear fuel into the upper portion of the chamber, and means for preventing the gaseous fission products from flowing into the interior of the vented nuclear fuel element, which lasted mentioned includes a check valve constructed of a porous plug and non-wetting liquid metal.

BRIEF DESCRIPTION OF THE DRAWING

Further objects, features and advantages of the present invention will become more clear from the following detailed description of two preferred embodiments as shown in the accompanying drawing, wherein.

DETAILED DESCRIPTION OF THE PREFERRED EMBODIMENTS

Figure 1:
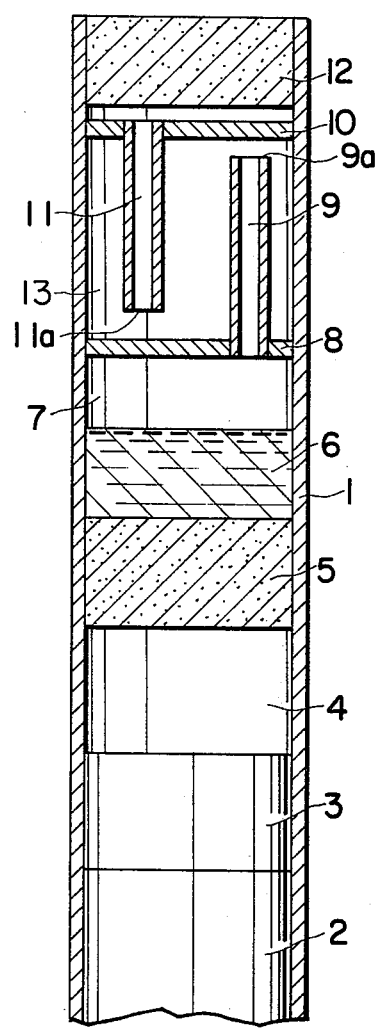
FIG. 1 is an axial cross sectional view taken through one embodiment of a vented nuclear fuel element according to the present invention.

Referring to FIG. 1, an embodiment of the vented nuclear fuel element according to the present invention will be described hereinafter.

The vented nuclear fuel element for fast breeder nuclear reactors comprises a cladding tube in which a core fuel element 2 and blanket fuel 3 are inserted as is well known with respect to nuclear fuel elements. Above the fuel 2 and 3, there is provied a device for venting gaseous fission products released from the nuclear fuel 2, 3, which device is disposed in the upper portion of the cladding tube 1 with a plenum chamber 4 being defined by the space between the blanket fuel 3 and the lower end of the venting device. The venting device is constructed as follows.

A porous plug member 5 is fixed to the cladding tube 1 across its entire interior cross section above the blanket fuel 3, with the plenum 4 therebetween; the porous plug member 5 is made of sintered stainless steel and is permeable to the gaseous fission products released from the fuel 2, 3 during operation of the nuclear reactor. The porous plug member 5 and a plate 8 that is fixed to the cladding tube 1 define therebetween a chamber. Within this chamber, a layer of molten or liquid metal 6 is contained so as to form a gaseous plenum chamber 7 between the metal layer 6 and the plate 8. The molten metal is preferably an alloy having a low melting point and the property of being dry to the porous member 5, and it preferably is constructed of lead and bismuth. The molten metal 6, in cooperation with the porous plug member 5 serves as a check valve to permit the flow of gaseous fission products upwardly, but not downwardly.

The terms dry and wet will be used throughout the specification according to their accepted normal usage insofar as they relate to the surface tension properties of a particular liquid in contact with a particular passage of a solid material, whether the passage be a capillary tube passage or the interstices of a porous member. A liquid that wets the solid has a greater adhesion than cohesion with respect to that solid, so that in the case of a wetting liquid, the surface tension will cause the liquid to rise within a small passage of the solid in which it is contact. For liquids that are dry with respect to or do not wet the solid, the surface tension will tend to depress the meniscus in a small passage, that is the liquid will not enter the small passage.

The dividing plate 8 has a capillary tube 9 extending therethrough vertically upwardly to the upper portion of a chamber 13 that is defined by the plate 8 and a similar plate 10 disposed thereover. The plate 10 is fixed to the cladding tube 1 and has a capillary tube 11 that extends through and is fixed to the plate 10, and extends downwardly toward the plate 8 to the lower portion of the chamber 13. Above the plate 10, there is disposed a porous plug 12 for closure of the upper end of the cladding tube 1, which plug 12 is fixed to the cladding tube 1 with a small axial space between the plate 10 and the bottom of the porous plug 12. The porous plug 12 is constructed of sintered stainless steel and has the property of getting wet with respect to the sodium that forms the coolant surrounding the cladding tube 1. Accordingly, the porous plug 12 is permeable to the gaseous fission products; however, the property of the surrounding coolant wetting the porous plug 12 brings about a large resistance when the gaseous fission products pass through the plug 12 from the chamber 13 to the coolant area, although the sodium contained in the porous plug 12 will gradually enter the chamber 13 by passing through the plug 12 and the capillary tube 11 to be stored within the chamber 13.

During operation of the reactor, gaseous fission products released from the nuclear fuel 2, 3 in the interior of the vented nuclear fuel element will reach the chamber 13 by passing through the plenum 4, the porous plug member 5, the molten metal 6, the plenum 7, and the capillary tube 9 to be discharged in the upper portion of the chamber 13. The gaseous fission products within the chamber 13 will be vented to the coolant surrounding the vented nuclear fuel element through the bottom end 11a of the capillary tube 11 and the porous plug 12. The gaseous fission products, as they are generated, will raise the pressure within the chamber 13 due to the porous plug 12 having the property of being wetted by the surrounding coolant, which property results in the high flow resistance of the gaseous fission products through the porous plug 12.

When the reactor is stopped, the temperature of the vented nuclear fuel element is lowered so that the volume of the gases will contract. However, the porous plug 5 and liquid metal 6 form a check valve that will prevent the gaseous fission products within the chamber 13 and plenum 7 from passing through the porous plug 5 back into the plenum 4 or area of the fuel. Accordingly, a large decrease in the pressure within the chamber 13 is not brought about. Further venting of the gaseous fission products from the chamber 13 through the plug 12 will end with stopping of the nuclear reactor, which will further tend to maintain the pressure within the chamber 13. Since stopping of the nuclear reactor prevents further penetration of the gaseous fission products through the porous plug 12 of the venting device and further prevents backflowing of the gaseous fission products into the interior of the vented fuel element, the pressure within the chamber 13 will be maintained sufficiently high such that even though coolant will enter the chamber 13, the coolant will not reach such a level within the chamber 13 that it will flow over the top 9a of the capillary tube 9, thus coolant will not enter the plenum 7. Therefore, the venting device has the advantage such that the coolant of the surrounding coolant and the molten metal 6 of the check valve means is avoided, without making the chamber 13 for holdup of the gaseous fission products unduly large.

In the event that the nuclear reactor is started after the above mentioned shutdown, it may be assumed that the coolant level within the chamber 13 has risen above the bottom end 11a of the capillary tube 11. With such startup, the pressure of the gaseous fission products within the chamber 13 will increase so as to cause the gaseous fission products to drive the coolant within the chamber 13 upwardly through the capillary tube 11 and out of the porous plug 12 to lower the coolant level within the chamber 13 to the bottom end 11a of the capillary tube 11; thereafter, further release of gaseous fission products from the fuel will cause the gaseous fission products to be vented out of the venting device as first described.

Figure 2:
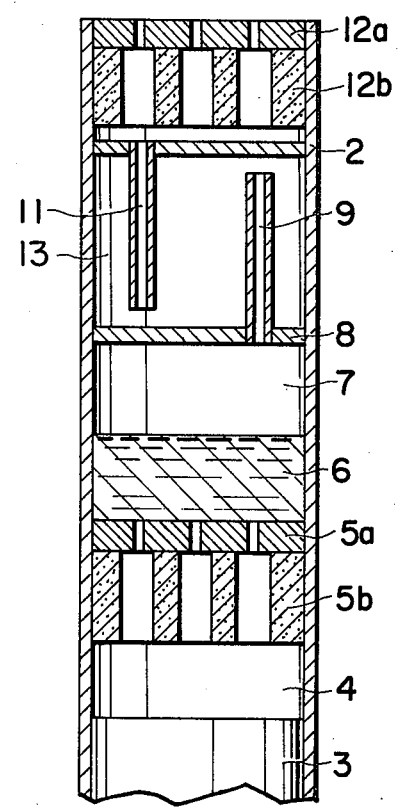
FIG. 2 is a similar axial cross sectional view, but taken through another embodiment of a vented nuclear fuel element according to the present invention.

The embodiment of FIG. 2 is very similar in structure and function with respect to the embodiment of FIG. 1, and accordingly those parts that are identical in structure and function with the corresponding parts of FIG. 1 will be provided with the same reference numerals and will not be described further, as a description of them may be found above with respect to FIG. 1

In FIG. 2, the check valve means comprises a plate 5a with a plurality of small passages that will not be wetted by the molten metal 6, which plate 5a is fixed to the interior of the cladding tube 1. A supporting member 5b has a plurality of larger holes therein and is fixed to the cladding tube 1 to support the plate 5a. The plate 5a and the supporting member 5b correspond to the porous plug member 5 of FIG. 1 in operation. Accordingly, the plate 5a has the property that it is dry to the molten metal 6 on the plate 5a. A plate 12a has a plurality of small holes and is mounted on a supporting member 12b that has a plurality of larger holes for supporting the plate 12a, and the supporting member 12b is fixed to the interior of the cladding tube 1. The plate 12a and supporting member 12b correspond to the porous plug 12 of FIG. 1 in operation. The plate 12a has the property of being wetted by the surrounding coolant. The remaining structural features of the vented nuclear fuel element shown in FIG. 2 are the same as in FIG. 1. The operation of the venting nuclear fuel element according to FIG. 2 is substantially the same as that previously described with respect to FIG. 1.

While several preferred embodiments of the present invention have been set forth in detail for purposes of illustration and to emphasize their important specific features, further embodiments, variations and modifications of the present invention are contemplated according to the broader aspects of the invention, all according to the spirit and scope of the following claims.

What is claimed is:

1. A vented nuclear fuel element venting gaseous fission products released from nuclear fuel disposed therein into the surrounding coolant, which comprises a vertical tubular container for containing the nuclear fuel therein, check valve means disposed over the top of the nuclear fuel for outwardly passing the gaseous fission products and for preventing the gaseous fission products from flowing back into the interior of the fuel element, said check valve means including a material in the liquid state at least under operating temperatures and a porous member not wet with the liquid state material for supporting the liquid state material, means for defining a chamber over the check valve means, and plug means disposed over the chamber, said plug means including a porous material that is wet with the surrounding coolant and prevents the gaseous fission products from passing through the porous material under a predetermined substantial pressure of the gaseous fission products and permits passage of the gaseous fission products through the porous material above the predetermined pressure for hold-up of the gaseous fission products in said chamber.

2. A vented nuclear fuel element as defined in claim 1, wherein said means for defining a chamber is two substantially horizontal upper and lower partitions disposed between said check valve means and said plug means, said lower partition having a capillary tube with an upper end terminating near the upper partition, said upper partition having a capillary tube with a lower end terminating near the lower partition.

3. A vented nuclear fuel element as defined in claim 1, wherein said check valve means porous member and said plug means porous material are each porous sintered metal powdered disks.

4. A vented nuclear fuel element as defined in claim 1, wherein each of said check valve means porous member and said plug means porous material includes a plate having a plurality of small capillary holes extending vertically completely therethrough.

5. A vented nuclear fuel element as defined in claim 1, wherein said check valve means porous member and said plug means porous material are each sintered stainless steel, and said liquid state material is an alloy comprising lead and bismuth.

* * * * *